United States Patent [19]

Tatsumi et al.

[11] 4,028,568
[45] June 7, 1977

[54] AC GENERATOR FOR VEHICLES

[75] Inventors: Hideo Tatsumi, Mito; Yasushi Ohuchi, Katsuta, both of Japan

[73] Assignee: Hitachi, Ltd., Japan

[22] Filed: Oct. 29, 1975

[21] Appl. No.: 626,991

[30] Foreign Application Priority Data

Oct. 30, 1974 Japan .............................. 49-124470

[52] U.S. Cl. .................................. 310/42; 310/91;
310/68 R; 310/168; 310/263
[51] Int. Cl.² ........................................ H02K 15/16
[58] Field of Search ................ 310/42, 68, 683, 89,
310/91, 168, 263

[56] References Cited

UNITED STATES PATENTS

| | | | |
|---|---|---|---|
| 1,490,205 | 4/1929 | Chatto | 310/91 |
| 1,816,859 | 8/1931 | Linders | 310/258 X |
| 2,235,807 | 3/1941 | Ballman | 310/42 UX |
| 2,423,750 | 7/1947 | Benson | 310/42 UX |
| 3,215,878 | 11/1965 | Woodward, Jr. | 310/263 X |
| 3,300,666 | 1/1967 | Frazier et al | 310/42 |
| 3,305,740 | 2/1967 | Shano | 310/42 |
| 3,321,654 | 5/1967 | Allendorph | 310/42 X |
| 3,501,660 | 3/1970 | Wightman et al. | 310/91 |
| 3,626,219 | 12/1971 | Lease | 310/42 |
| 3,656,017 | 4/1972 | Inagaki et al. | 310/168 X |
| 3,705,994 | 12/1972 | Berry, Jr. | 310/91 |

*Primary Examiner*—Donovan F. Duggan
*Attorney, Agent, or Firm*—Craig & Antonelli

[57] ABSTRACT

An ac generator for a vehicle in which a stator frame having a stator core fixed thereto and supporting a rotary shaft therein is composed of a pair of end covers of steel plate and a cylindrical casing of steel plate, and the end covers, cylindrical casing and stator core are integrally connected together by welding so as to ensure a high mechanical strength.

3 Claims, 2 Drawing Figures

AC GENERATOR FOR VEHICLES

BACKGROUND OF THE INVENTION

This invention relates to ac generators for vehicles, and more particularly to an ac generator of the kind which has an inexpensive stator frame of steel plate and is thus suitable for use in automobiles.

Economization of industrial resources is presently strongly called for, and an attempt is now being made to employ inexpensive and readily available steel plates for the fabrication of stator frames of rotary electric machines of relatively small size. In spite of such tendency, however, die castings of aluminum are presently widely used for the greater part of conventional stator frames of ac generators for automobiles for various reasons as enumerated below. In the first place, a stator frame structure has not had sufficient mechanical strength to withstand vibration of large amplitude when a steel plate is used to form the stator frame of such rotary electric machine. Especially, a stator unit constituted by integral connection of a cylindrical casing of steel plate, a stator core, flanges and end covers of steel plate has been defective in that such stator unit tends to resonate with engine or vehicle body vibration resulting in breakage of the flanges, loosening of the stator core fixed to the cylindrical casing, etc. Secondly, the bolts used for fixing the cylindrical casing to the end covers have tended to become loose, and an attempt to prevent this undesirable loosening has resulted in an uneconomical increase in the magnetic losses of the magnetic circuit. Thirdly, although a method of fixing the stator core to the cylindrical casing by welding the flanges to the cylindrical casing, forcing the stator core having the stator widning thereon into the cylindrical casing, and then bolting the stator core to the cylindrical casing has been proposed, this method has been defective in that the stator unit thus obtained is mechanically weak against vibration of large amplitude, and the bolts fixing the stator core to the cylindrical casing tend to be loosened. In an effort to obviate the above defect, another method has been proposed in which the stator core is fixed to the cylindrical casing by welding. However, due to the fact that the radial thickness of the stator core used in the ac generator of this kind is of the order of 5 to 6 mm and is thus very small compared with the thickness of 10 to 20 mm of the stator core in small-sized induction motors, it has been impossible to prevent the widning and insulator portions of the ac generator from being extremely deteriorated during welding.

SUMMARY OF THE INVENTION

It is an object of the present invention to provide an ac generator for a vehicle which is provided with a stator frame of steel plate construction having a high mechanical strength and can withstand excessive vibration.

Another object of the present invention is to provide an ac generator of the above kind which is constructed to permit use of steel plates for forming the stator frame.

In accordance with the present invention, there is provided an ac generator driven by the engine of a vehicle comprising a stator including a stator core, a stator winding wound around said stator core, and a stator frame surrounding said stator core, and a rotor including rotary magnetic poles and a field winding and rotatably supported within said stator frame, wherein said stator frame is constituted by a pair of end covers of steel plate and a substantially cylindrical casing formed into the shape by rounding a steel plate.

In the ac generator according to the present invention, the cylindrical casing of steel plate, the end covers of steel plate and the stator core are simultaneously firmly welded together as a unit, and by virtue of this unitary welded structure, undesirable resonance can be reduced to a minimum and the desired mechanical strength can be obtained.

DESCRIPTION OF THE PREFERRED EMBODIMENT

Figure 1:
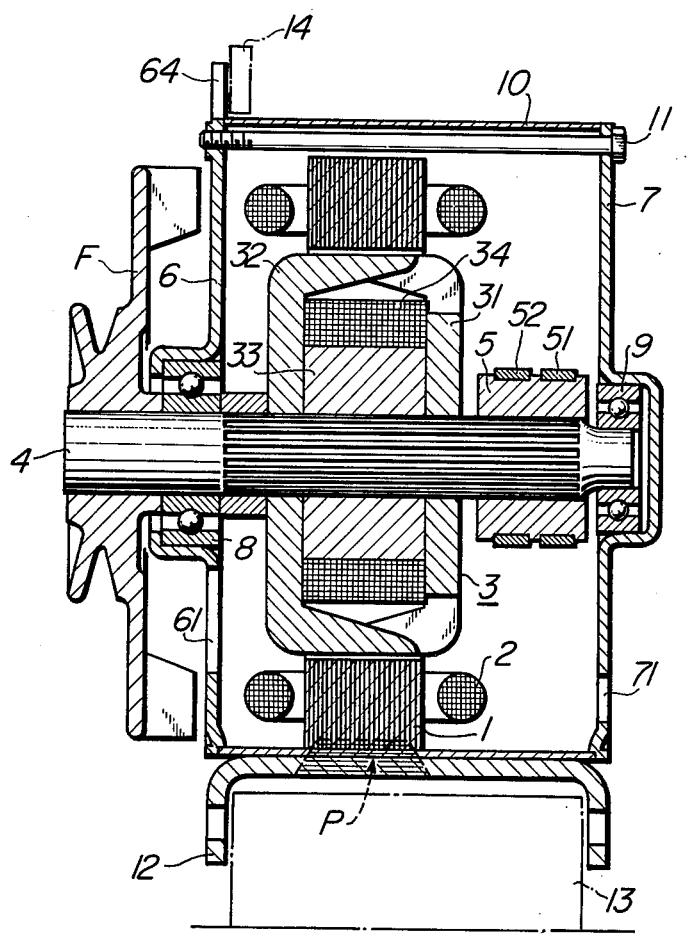
FIG. 1 is a sectional view of an embodiment of the ac generator according to the present invention.

Referring now to the drawing showing a preferred embodiment of the present invention, a stator includes a stator core 1 of laminated steel sheet structure and a stator winding 2 wound around the stator core 1. A rotor 3 includes a pair of pawl-like magnetic poles 31 and 32, a yoke 33 and a field winding 34. The rotor 3 is mounted on a rotary shaft 4 for rotation therewith. A slip ring unit 5 including annular conductors 51 and 52 is mounted on the rotary shaft 4 in coaxial relation with the rotor 3. A pair of end covers 6 and 7 of steel plate having respective ventilation openings 61 and 71 support the rotary shaft 4 through respective bearings 8 and 9. A substantially cylindrical casing 10 of steel plate is tightly held between the end covers 6 and 7 by the fastening force of through bolts 11. A seat 12 for mounting the generator thereon is connected to a rigid supporting arm 12 fixed to an engine casing in a vehicle. A cooling fan F is shown mounted on the rotary shaft 4.

Figure 2:
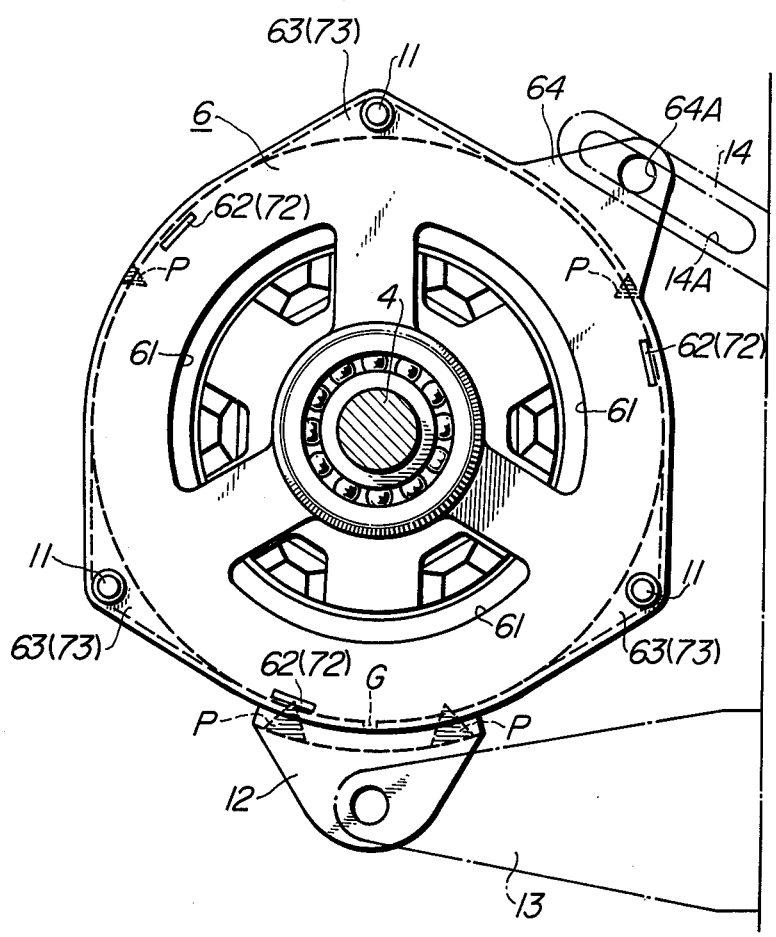
FIG. 2 is a side elevational view of the ac generator shown in FIG. 1.

The end covers 6 and 7 are formed on the inner wall thereof with a plurality of lugs 62 and 72 respectively which are substantially equally spaced from each other on the same circumference, and three such lugs 62 and 72 are provided in the form shown in FIG. 2. The end covers 6 and 7 are also formed on the outer periphery thereof with a plurality of radial projections 63 and 73 respectively which are substantially equally spaced from each other along the outer periphery, and three such radial projections 63 and 73 are provided in the form shown in FIG. 2. A flange 64 having a bolt hole 64A is formed as an integral part of at least one of the end covers 6 and 7 or the end cover 6 in the form shown in FIG. 2. A threaded hole is bored in each of the radial projections 63 of the end cover 6 to make threaded engagement with the threaded shank portion of the associated through bolt 11, while a non-threaded hole is bored in each of the radial projections 73 of the other end cover 7 opposite to the threaded bolt hole to receive therein the nonthreaded shank portion of the associated through bolt 11.

The cylindrical casing 10 is fabricated by rounding a steel plate having a wall thickness of about 2 mm and has an outer peripheral contour which conforms to that of the end covers 6 and 7. Thus, the cylindrical casing 10 is partly polygonal in shape, and the shape is limited by the position of the lugs 62 and 72 of the end covers 6 and 7. Therefore, a space is naturally formed between the cylindrical casing 10 of such shape and the stator core 1 so that the through bolts 11 can extend freely across this space.

The generator mounting seat 12 has a substantially U-like shape and is formed by bending a steel plate having a wall thickness which is two or three times that of the cylindrical casing 10. Thus, this generator mounting seat 12 has a high rigidity. This generator mounting seat 12 is disposed outside the cylindrical casing 10 in such a relation that the longitudinal centerline thereof registers with the gap G defined between the abutting ends of the cylindrical casing 10 as seen in FIG. 2. Then, welding is applied from the outer peripheral side of the cylindrical casing 10 toward the stator core 1 at a plurality of spaced positions so that the stator core 1, cylindrical casing 10 and mounting seat 12 can be integrally fixed together by a plurality of welds P, and also, the stator core 1 and cylindrical casing 10 can be integrally fixed to each other by a plurality of welds P as shown.

The seat 12 mounting the generator of above construction is then tightly bolted to the rigid supporting arm 13 fixed to the engine casing. The flange 64 is provided for adjusting the tension imparted to a generator driving belt. A bolt is passed through the bolt hole 64A of the flange 64 to be received in a bolt-receiving slot 14A of a member 14 fixed to the engine casing, and this bolt is locked in a suitable position in the slot 14A so that the tension imparted to the driving belt can be adjusted within the extent of the slot 14A.

In the generator to which the present invention is applied, the radial thickness of the stator core 1 (that is, the arcuate portion between the bottom of the slots of the stator and the outer periphery of the stator) is considerably small or of the order of 6 mm, and thus, application of welding to the assembly after completion of the winding work may result in undesirable destruction of the insulation on the stator winding. In the present invention, therefore, the laminated stator core 1 is integrally welded to the cylindrical casing 10 and to the mounting seat 12 before the winding and insulation are applied to the stator core 1, and then, insulation of the stator slots, application of the stator winding 2 and application of insulating varnish are carried out.

The lugs 62 and 72 provided on the end covers 6 and 7 can be easily formed as by press-forming.

It will thus be seen that prior art ac generators for vehicles having a die-cast aluminum stator frame can now be replaced by inexpensive ac generators having a stator frame of steel plate construction which has not heretofore been put into practical use from the viewpoint of reliability.

According to the present invention, an inexpensive steel plate can be used to provide the stator frame of ac generators for automobiles and can be economically formed into the shape by a process such as cold-forming or press-forming, whereas all the stator frames of the prior art ac generators for automobiles are expensive die casings of aluminum. Therefore, a 20 to 30% reduction can be made in the manufacturing cost of the ac generators. Further, the stator in the ac generator according to the present invention is sufficiently rigid due to the fact that the stator core, cylindrical casing and mounting seat are integrally firmly welded together. Therefore, undesirable loosening of the stator core can be completely eliminated and excessive resonance with the vibration energy transmitted from the engine can be avoided so that the ac generator can operate stably and reliably in spite of the fact that the stator frame is of steel plate construction.

Furthermore, due to the fact that the cylindrical casing is partly polygonal in shape thereby defining between the inner wall surface thereof and the stator core a space across which the through bolts can freely extend, the portions of the end covers adjacent to the bolts can be uniformly pre-stressed so that undesirable loosening of the bolts can be easily prevented. Moreover, the special provision of the said space for utilizing this space for the purpose above described is also effective in reducing the magnetic loss to less than that occurred in the prior art structure in which the slots for receiving the through bolts are especially formed on the outer periphery of the stator core.

It will be appreciated from the foregoing description that the present invention provides an inexpensive ac generator which exhibits an excellent operating characteristic especially when used for automobiles in spite of the fact that the stator frame thereof is constructed by the combination of the parts of steel plate instead of the prior art aluminum die casting.

We claim:

1. In an ac generator driven by the engine of a vehicle comprising a stator including a stator core, a stator winding wound around said stator core, and a stator frame surrounding said stator core, and a rotor including rotary magnetic poles and a field winding and rotatably supported within said stator frame, the improvement wherein said stator frame comprises a pair of steel plate end covers and a steel plate cylindrical casing confined between said steel plate end covers, and further comprising a U-shaped generator mounting seat affixed to said stator frame and wherein said stator core, end covers, cylindrical casing and U-shaped seat are welded together as an integral unit.

2. The improvement according to claim 1, wherein each of said end covers is provided with a plurality of spaced apart lugs on the inner walls thereof.

3. The improvement according to claim 1, wherein said end covers are each formed with a plurality of radial projections which are suitably spaced from each other on the same circumference, and said cylindrical casing is shaped to conform to the outer peripheral contour of said end covers, so that through bolts can extend freely across the space defined between said radial projections and said stator core to tightly hold said cylindrical casing between said end covers.

* * * * *